(12) United States Patent
Bigot et al.

(10) Patent No.: US 8,794,058 B2
(45) Date of Patent: Aug. 5, 2014

(54) DEVICE AND METHOD FOR MEASURING THE TREAD DEPTH OF A MOTOR VEHICLE TIRE

(75) Inventors: Franck Bigot, Neutraubling (DE); Thomas Haas, Donaustauf (DE); Franz Hillenmayer, Burglengenfeld (DE)

(73) Assignee: Continental Automotive GmbH, Hannover (DE)

( * ) Notice: Subject to any disclaimer, the term of this patent is extended or adjusted under 35 U.S.C. 154(b) by 354 days.

(21) Appl. No.: 13/146,688

(22) PCT Filed: Jan. 18, 2010

(86) PCT No.: PCT/EP2010/050540
§ 371 (c)(1),
(2), (4) Date: Oct. 3, 2011

(87) PCT Pub. No.: WO2010/086250
PCT Pub. Date: Aug. 5, 2010

(65) Prior Publication Data
US 2012/0011926 A1    Jan. 19, 2012

(30) Foreign Application Priority Data

Jan. 28, 2009  (DE) .................. 10 2009 006 458

(51) Int. Cl.
*B60C 23/02* (2006.01)
(52) U.S. Cl.
USPC .......................................................... 73/146
(58) Field of Classification Search
USPC .......................................................... 73/146
See application file for complete search history.

(56) References Cited

U.S. PATENT DOCUMENTS

| | | | |
|---|---|---|---|
| 5,546,070 | A | 8/1996 | Ellmann et al. |
| 5,749,984 | A | 5/1998 | Frey et al. |
| 7,577,532 | B2 | 8/2009 | Ichikawa et al. |
| 7,661,300 | B2 | 2/2010 | Sinnett et al. |
| 8,026,802 | B2 | 9/2011 | Shimura |
| 8,035,501 | B2 | 10/2011 | Fink et al. |
| 8,371,159 | B2 | 2/2013 | Morinaga |
| 2003/0005760 | A1 | 1/2003 | Bulst et al. |
| 2005/0257609 | A1 | 11/2005 | Mancosu et al. |
| 2008/0027658 | A1* | 1/2008 | Ichikawa et al. .............. 702/34 |
| 2008/0191855 | A1* | 8/2008 | Fink et al. .................... 340/447 |
| 2010/0295669 | A1 | 11/2010 | Pannek |

FOREIGN PATENT DOCUMENTS

| | | |
|---|---|---|
| DE | 4329591 A1 | 3/1995 |
| DE | 10157263 A1 | 5/2003 |
| DE | 102007007135 A1 | 11/2008 |
| DE | 102008006566 A1 | 7/2009 |
| EP | 1 359 957 A2 | 10/2003 |

(Continued)

*Primary Examiner* — Lisa Caputo
*Assistant Examiner* — Brandi N Hopkins
(74) *Attorney, Agent, or Firm* — Laurence A. Greenberg; Werner H. Stemer; Ralph E. Locher

(57) ABSTRACT

A device and a method for measuring the tread depth of a motor vehicle tire. The device includes at least one sensor element which is configured to acquire data on a change of the deformation characteristics of the motor vehicle tire in the area of the tire contact area and can be fixed in the area of the inner side of the motor vehicle tire opposite the tread; and a control and evaluation unit for evaluating and processing the acquired data. The unit is data-connected to the at least one sensor element.

21 Claims, 3 Drawing Sheets

(56) References Cited

FOREIGN PATENT DOCUMENTS

| | | | |
|---|---|---|---|
| EP | 1 759 891 A1 | 3/2007 |
| EP | 2172759 A1 | 4/2010 |
| JP | 2003-65871 A | 3/2003 |
| JP | 2006123581 A | 5/2006 |
| JP | 2006176032 A | 7/2006 |
| JP | 2007153034 A | 6/2007 |
| WO | 0164460 A1 | 9/2001 |
| WO | 2006001255 A1 | 1/2006 |
| WO | 2006/098714 A1 | 9/2006 |
| WO | 2009/095113 A1 | 8/2009 |

* cited by examiner

DEVICE AND METHOD FOR MEASURING THE TREAD DEPTH OF A MOTOR VEHICLE TIRE

BACKGROUND OF THE INVENTION

Field of the Invention

The invention relates to a device and to a method for measuring the tread depth of a motor vehicle tire.

In Germany and in most European countries, a minimum tire tread depth in the central part of the tread (main profile grooves) of 1.6 mm is legally prescribed. The tires must be provided with profile grooves around the entire circumference of the tread. If the tread depth approaches the legally prescribed minimum tread depth, the braking distance increases, in particular in wet conditions. On roads which are wet from rain, a small tread depth may lead to aquaplaning, even at low speeds.

In order to detect visually when a tire has a tread depth of 1.6 mm, it has previously been known to arrange transverse webs in the longitudinal profiles, distributed at a plurality of locations of the circumference of the tire in the main profile grooves in the tire shoulder. These transverse webs are also designated as TWI (Tread Wear Indicator). These are web-like elevations in the longitudinal grooves which become visible when the tire becomes worn as far as the 1.6 mm residual tread depth. However, this can be detected visually only from the outside and at the vehicle.

German laid-open patent application DE 101 57 263 A1 discloses a method for determining the tread depth or the tread wear of a tire during the operation of the vehicle. Magnetically conductive elements are arranged at different positions in the tread and generate, in a sensor positioned outside the tread, electrical signals in an electromagnetic or electrodynamic fashion, said electrical signals being fed to an electronic evaluation unit which determines the current state of wear of the tread as a function of the type of signals and displays or indicates said state of wear, at least when a threshold value which is adapted to the maximum permissible wear has been reached.

In order to measure the tread depth during operation, the sensor must generally be arranged very close to the tread in order to still supply reliable values. Such sensors which are mounted near to the tread are disruptive, for example when changing a wheel.

BRIEF SUMMARY OF THE INVENTION

The invention is therefore based on the object of providing a device and a method for measuring the tread depth of a motor vehicle tire, in which device and method the tread depth can be determined continuously in a simple and reliable way during travel.

This object is achieved by a device having the features as claimed and by a method having the features as claimed.

Accordingly, a method and a device for measuring the tread depth of a motor vehicle tire are made available, wherein at least one sensor element is provided which is designed to acquire data relating to a change in the deformation characteristic of the motor vehicle tire in the region of the tire contact area and can be permanently mounted in the region of the inner side of the motor vehicle tire lying opposite the tread; wherein in addition a control and evaluation unit which has a data connection to the at least one sensor element and has the purpose of evaluating and further processing the acquired data is provided.

In the invention, a sensor element is accordingly arranged on the inside of the vehicle tire or in the tread. The sensor element is located in the tire in a region opposite profile lugs and/or profile grooves. When the wheel rotates (during travel), the tread deforms, and depending on the tread depth or else material thickness of the tread a more or less pronounced kink is brought about at the edge of the tire contact area. Since the sensor element senses the mechanical deformation and the measured values can be compared with previous values, the tread depth can be determined in a control and evaluation unit on the basis of the data transmitted by the sensor elements.

The present invention therefore has the advantage over the prior art that reliable display or indication of the instantaneous tread depth of the respective motor vehicle tire to the motor vehicle user is ensured in a simple and cost-effective way.

The dependent claims contain advantageous refinements and developments of the claimed device and the claimed method, respectively.

According to one preferred development, the sensor element is embodied as a planar piezoelement or as a planar strain gauge. However, for a person skilled in the art it is obvious that other sensor elements which supply data relating to a change in the deformation characteristic of the motor vehicle tire in the region of the tire contact area can also be suitable.

According to a further preferred development, the sensor element extends essentially along the running direction of the motor vehicle tire and over at least one section region of a lug and/or over at least one section region of a groove of the motor vehicle tire.

If a plurality of sensor elements are arranged in a tire, it is advantageous to arrange them along a circumferential line of the tread. As a result, only measured values which have equally high loading during travel are acquired. This is because, during cornering, regions of the tread lying on the outside of the bend are subjected to higher loading and therefore deformation. If the sensor elements were only arranged transversely with respect to the running direction, the sensor elements lying on the outside of the bend would be deformed to a greater extent than the sensor elements lying on the inside of the bend. As a result, an incorrect tread depth could possibly be displayed or indicated.

According to further preferred exemplary embodiment, a transmission unit, which indirectly or directly passes on the data measured by the sensor element or elements to the control and evaluation unit, is assigned to the sensor element or to an entire group of sensor elements. The control and evaluation unit is preferably located in the motor vehicle itself at a suitable position.

The sensor element is also preferably electrically connected to an assigned wheel electronic system by means of which additional data can also be transmitted to the control and evaluation unit, such as for example tire pressure data, tire temperature data, vehicle speed data, wheel speed data, tire identification data, sensor element data, vehicle data, wheel load data or the like. For a person skilled in the art it is obvious that in addition to the above-mentioned data it is also possible to use further data for determining the tread depth if it is desired and appropriate to do so.

According to a further preferred exemplary embodiment, a plurality of sensor elements are each arranged in a motor vehicle tire on a circumferential line along the circumference of the tread of the respective motor vehicle tire. Alternatively or additionally, a plurality of sensor elements in a motor vehicle tire can also be arranged transversely with respect to the running direction of the motor vehicle tire.

During travel, data are preferably acquired continuously or at predetermined intervals by means of the respective sensor elements and are transmitted to the control and evaluation unit which correspondingly evaluates the respectively supplied data and determines the respectively assigned tread depths. For this purpose, predetermined algorithms can be used as a function of the evaluated parameters. The individual acquired data relating to different times and/or the data relating to the same times, which have been acquired by means of different sensor elements, can be compared with one another, checked for plausibility and used together to determine the actual IST tread depth of the respective tire.

According to a further preferred exemplary embodiment, a tire-specific identifier is also transmitted with each measured value in a transmission signal in order to determine the calculated tread depth and the wheel position of the associated motor vehicle tire. The motor vehicle user is therefore informed unambiguously as to which motor vehicle tire is to be replaced under certain circumstances.

The invention will be explained in more detail below on the basis of a plurality of exemplary embodiments and with reference to the associated schematic figures in the drawing, of which:

DESCRIPTION OF THE INVENTION

Figure 1:
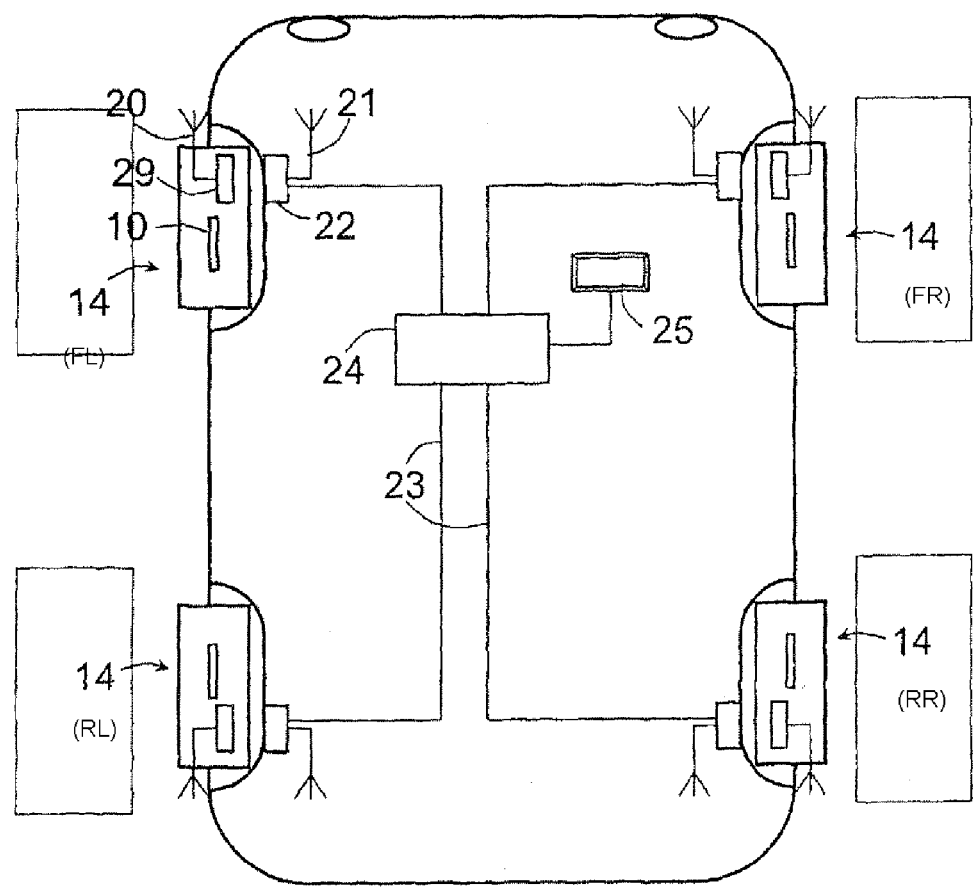
FIG. 1 is a schematic illustration of a device according to the invention which is respectively assigned in one of the four tires of a motor vehicle, according to a preferred exemplary embodiment of the present invention.

In the figures of the drawing, identical and functionally identical elements and features are provided with the same reference symbols, unless stated otherwise.

FIG. 1 shows a schematic block diagram of a preferred exemplary embodiment of a device for measuring the tread depth of a motor vehicle tire. In this context, one or more sensor elements 10 are arranged in, in each case, one tire 11 on the inner side of the tire opposite the tread 12 or in the tread wall. The sensor elements 10 measure the deformation of the tread 12 in the edge region of the tire contact area 13. Depending on the thickness 17 of the material of the profiled tread 12, a kink 15 of a greater or lesser magnitude is brought about at the edge of the tire contact area 13 transversely with respect to the rolling direction (running direction) of the wheel 14. The kink 15 constitutes a deformation or relatively high degree of bending of the tread 12 in a departure from the circular shape of the cross section of the tire (in particular of the tread 12). The tread depth 16 (see FIG. 2) of the tire 11 can be derived from the degree of deformation (degree of bending) and/or by comparing the current deformation with previous measured values and/or previously stored values.

In FIG. 1, the design of the device according to the present exemplary embodiment is explained by way of example on the basis of the tire 11 in the wheel position front left (FL). For a person skilled in the art it is obvious that the devices in the tires 11 of the wheel positions front right (FR), rear left (RL) and rear right (RR) can be of identical design.

In the present exemplary embodiment, the data which are measured by the sensor elements 10 are transmitted as signals in a wireless fashion via antennas 20 in the respective wheel 14 to motor-vehicle-side antennas 21 of a respectively assigned receiver unit 22. The transmission here can be performed together with tire pressure measured values, as is described in German laid-open patent application DE 10 2007 007 135 A1, the disclosure content of which is included herewith as a component of the present disclosure. This has the advantage that antennas and transmitting and receiving elements of a tire pressure measuring device which are already present in any case can also be used.

The data are fed from the respective receiver units 22 via signal lines 23 or a data bus to a central control and evaluation unit 24 which evaluates the data and compares them with previously measured data or reference values. If a tread depth 16 is determined which reaches or exceeds or undershoots a predefined limiting value, an optical or acoustic display or indicator unit 25 is activated and informs the motor vehicle user of the possibly incorrect tread depth 16 and, if appropriate, of the corresponding wheel position. The tires 11 of the motor vehicle can therefore be changed in good time before the tread depth 16 has reached the legally prescribed minimum tread depth or another correspondingly predefined minimum tread depth and the risk of an accident owing to an excessively small tread depth 16 becomes too large.

The limiting value does not necessarily have to coincide with the legally prescribed minimum tread depth. It is advantageous if the motor vehicle user is informed of the imminent excessive degree of wear of the tires 11 in good time before the predetermined minimum tread depth is reached. It would be possible also to indicate, on the basis of the previous profile of the wear (also referred to as the gradient of the wear or else as the gradient of the profile of the tread depth 16) how many kilometers could possibly still be traveled before the tires 11 should definitely be changed. Otherwise, owing to the excessively small tread depth 16 situations which are critical in terms of traffic safety could arise and lead to an accident.

The measured values and/or the corresponding tread depths 16 could also be written, for example, into a diagnostic memory (not illustrated in the figures) and read out using a diagnostic device in a workshop.

Each wheel 14 can respectively be spatially assigned a receiver unit 22 by virtue of the fact that the receiver unit 22 is arranged, for example, on the wheel case at the level of the tread 12. If the wheel 14 rotates, the transmitter unit in the wheel 14 moves into the vicinity of the receiver unit 22 for corresponding data transmission once per rotation.

The antenna 21 can be arranged in the air valve of the inner tube of the tire 11 in order to better transmit the signals from there, largely without disruption by the structure of the tire (such as, for example, a steel belt), to the motor-vehicle-side antenna 22. The antenna 21 can also be arranged as a loop in the lateral surface of the tire 11 toward the vehicle side in order to be able to transmit the signals well to the antenna 22.

The amplitude or the signal strength of the transmission signals can also be of such a magnitude that the position of the receiver unit 22 is not significant and the signals of each antenna 21 in the wheel 14 can be satisfactorily received and evaluated by a single central receiver unit (the latter is not illustrated in the figures).

However, it is then advantageous if the respective devices in the tire 11 are individually encoded, wherein this encoding should be assigned to a wheel position. This encoding or else tire-specific or wheel-specific identifier is transmitted with each measured value for the deformation in the transmitted signal to the control and evaluation unit 24. The assignment of the identifier to the respective wheel position in the motor vehicle is stored, for example, in the control and evaluation unit 24.

If a wheel position is assigned to each encoding or identifier when initialization first takes place, a wheel position can be assigned to the determined tread depth 16, and the motor vehicle user can be informed which tire 11 is to be at least replaced. Of course, a plurality of tires 11 or all the tires 11 can then also be replaced.

The current tread depths 16 of all the tires 11 of the motor vehicle can also be indicated or displayed by the display or indicator unit 25 irrespective of whether a limiting value is reached (exceeding or undershooting of a threshold value), so that the motor vehicle user or the service personnel can themselves decide whether the tires 11 should be changed.

Each sensor element 10 or a group of sensor elements 10 in a tire 11 can be respectively assigned a transmitter unit 29 or signal transmission unit in the tire 11 which directly or indirectly transmit the measured values as a signal to further elements and/or ultimately to a control and evaluation unit 24.

Figure 2:
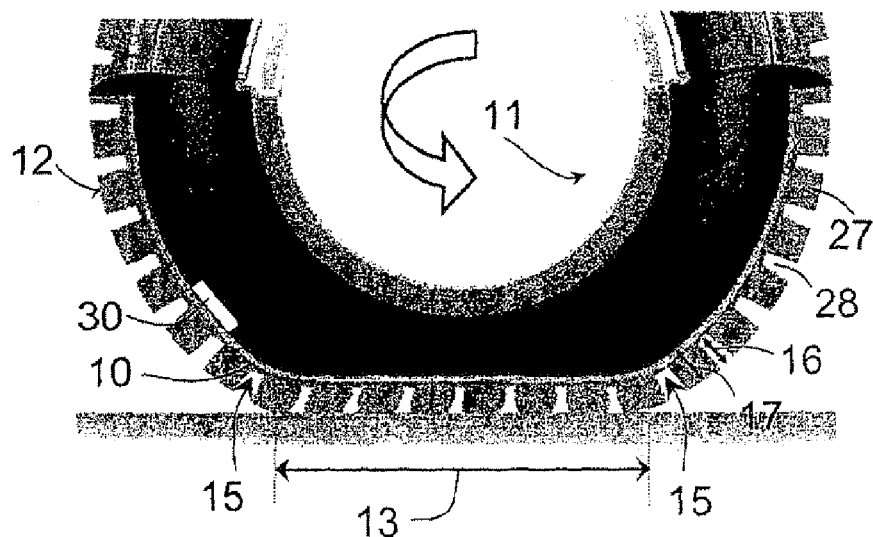
FIG. 2 shows a view of a partial section along the tread through a motor vehicle tire in which a sensor element of a device according to the invention is arranged according to a preferred exemplary embodiment of the present invention.

In FIG. 2 and in the further figures, functionally identical or structurally identical elements have the same reference symbols as in FIG. 1. In FIG. 2, for example, a sensor element 10 is illustrated which is correspondingly mounted at the edge of a tire contact area 13 of the tire 11 on the inner side of the tread 12, i.e. right in the region of the kink 15. The sensor element 10 is therefore deformed or bent to a greater degree compared to its previous shape, which is sensed by measuring technology.

The tire contact area 13 or the tread contact is that part of the tire 11 which maintains contact with the road. Owing to the weight of the vehicle and the elastic tire 11, the external shape of the tread 12 deviates from the circular shape.

The profiled circumferential strip on which the carcass 18 can be applied in the interior of the tire 11 is referred to here as the tread 12. The tread 12 is that part of the tire which comes into contact on its outer side with the road. The rubber mixture of the tread 12, together with the adjustment of the carcass, determine the wear resistance and the grip of a tire. The tread 12 contains the profile design (profile blocks or profile lugs 27 and profile grooves 28 or profile channels). The lugs 27 can also have sipes (indents in a profile block or profile lug) whose tread depth is not decisive for the tread depth 16 which is to be actually monitored, in the central region of the tread 12. This is because only the tread depth 16 of the main profile grooves is decisive.

The sensor element 10 is arranged on the inner side of the vehicle tire 11 or in the tread 12. This means that the sensor element can be arranged in the material of the tread 12 (also referred to as "located in the tread wall") in a carcass 18, between carcass 18 and tread 12 or also on the tire inner side of the carcass 18 (i.e. in the region in which the air of the tire 11 is located).

In FIG. 2, a kink 15 in the tread 12 transversely with respect to the running direction of the wheel 14 is respectively illustrated at the edge of the tire contact area 13. The kink 15 is here the transition between the circular circumferential line of the tread 12 and the region of the tire contact area 13 in which the circumferential line runs approximately parallel to the ground. The severity of the kink 15 depends here on the thickness 17 of the material of the tread 12, the profiling in this region and/or the tire air pressure.

Since the tread 12 is profiled, i.e. is provided with profile lugs (referred to below as lugs 27) and profile grooves (referred to below as grooves 28), the kink 15 is formed in essentially the same shape over the width of the tire 11 at least during straight-ahead travel since the tire 11 is usually stabilized in its tread, for example by a steel belt.

The thickness 17 of the material in the region of the lugs 27 decreases with the wear of the tire 11. Along with this there is a decrease in the tread depth 16, since the base of the grooves 28 is not worn away. The kink 15 at the edge of the tire contact area 13 becomes "sharper" or more defined the thinner the wall of the tread 12 becomes. In addition, the kink 15 is still dependent on the respective prevailing tire pressure, which is because the lower the tire pressure the larger the kink 15.

The kink 15 or even generally the deformation of the tread 12 in the edge region of the tire contact area 13 can be detected twice per rotation of the tire here, specifically in each case at the edge of the tire contact area. The sensor element 10 therefore experiences deformation twice per rotation, which deformation migrates over the entire length when viewed in the circumferential direction of the tire 11. In order to detect this deformation, at least one corresponding sensor element 10 is arranged in the material of the tread 12, on the inner side of the carcass 18 or between carcass 18 and tread 12 in the region opposite the profile of the profiled tread 12, and preferably permanently connected to the material.

The sensor element 10 is preferably connected to the tread 12 here in such a way that it largely synchronously also undergoes the movement and deformation of the tread 12. The sensor element 10 therefore rotates with the wheel 14 and passes through the kink 15 in the edge region of the tire contact area 13 twice per rotation. As a result, the sensor element 10 experiences mechanical deformation twice per rotation as a result of the kink 15, and the said deformation is measured.

This deformation is detected by measuring technology using a suitably configured sensor element 10. Measured values are then transmitted as data to the control and evaluation unit 24 which further processes the evaluation data. In said control and evaluation unit 24, the values are compared with a series of previously measured values or with initial values which have been recorded after the initial use of the tires 11 in a type of initialization. The time profile of the wearing of the tire tread and therefore the current tread depth 16 are determined, starting from an initial tread depth, in particular if the initial tread depth and the dependence of the material thickness 17, of the tire pressure and of the properties of the material of the tire on the wear, are known.

The measurement of the deformation can take place here whenever the sensor element 10 passes through the kink 15. The deformation can also be sensed, for example, only at every n-th run through. This is because the wearing of the tread 12 is a slowly occurring process. The difference in the tread depth 16, which has been determined during two successive rotations of the wheel 14 is certainly so small that it is virtually impossible to measure by means of measuring technology. The measured values could, for example, be measured every kilometer or every 1000 rotations in order to obtain over time a profile of the tread depths 16 or to obtain a gradient of the profile from which a prediction about the reaching of the limiting value in the case of wear can be made, assuming that the tire 11 experiences wear in a uniform and evenly shaped fashion.

The sensor element 10 should extend in a planar fashion at least in a region opposite the lugs 27. The sensor element 10 can also extend opposite a region in which one or more grooves 28 and one or more lugs 27 are present. It is also possible for the deformation to be sensed in the region opposite a lug 27 in comparison with the deformation in the region opposite a groove 28 with, in each case, one sensor element 10. If the planar extent along the direction of travel (along the circumference of the tread 12 or along the rolling movement of the wheel 14) is provided, the kink 15 at the edge of the tire contact area will act on the sensor element 10 during the rotation of the wheel 14 for as long as the kink 15 is located in the region of the sensor element 10 during the rotation of the wheel 14. The longer a sensor element 10, the longer the effect of the deformation on the sensor element 10. As a result, a clearer or larger extension signal or compression signal is generated, as a result of which the deformation is represented better.

If the tire 11 rolls over small pointed objects, these measured values should preferably not influence the measurement of the tread depth 16 since even though they bring about deformation they do not constitute an error in terms of measuring technology.

Deformations of the tread 12 which last for a short time and which are later no longer present should be gated out from the determination of the tread depth 16. Only changes in the deformation which are measured continuously should preferably be used for determining the tread depth 16.

Traveling over the edge of a curb certainly generates a large kink 15 and therefore a large deformation and as a result a large measured value. However, if such a large deformation were not detected in the previously measured values and in the values measured thereafter, this is not due to wear of the profile but rather to a "one-off" event which can be ignored when evaluating the tread depth 16.

According to FIG. 2, a wheel electronic system 30 is also arranged in the tire 11, as is also described in DE 10 2007 007 135 A1, and the description thereof is a component of the disclosure of the present application. The wheel electronic system 30 can measure tire parameters such as, for example, air pressure of the tires 11 and/or temperature and transmit these measured values to the control and evaluation unit 24. The control and evaluation unit 24 can additionally take into account the tire pressure and/or the temperature in the tire and outside for the determination of the tread depth 16, since different tire pressures supply different measured values despite the same tread depth 16.

The ambient conditions can also be taken into account for the determination of the tread depth 16. When the surroundings are very cold, the rubber of the tires is rigid, while when the surroundings are very warm the mobility of the tire material increases. This also has effects on the size of the kink 15 and therefore also on the determination of the tread depth 16.

The wheel electronic system 30, which is present in any case in certain circumstances, can also advantageously be used as a transmitter unit 29 or transmission unit in the tire 11. Consequently, the measured values can be transmitted indirectly or directly from the sensor elements 10 via the wheel electronic system 30 to the control and evaluation unit 24.

For this purpose, the sensor element 10 is electrically connected (line-bound or wireless) to the wheel electronic system 30. It is particularly advantageous if the sensor element 10 is arranged near to the wheel electronic system 30 so that the transmission paths are short and therefore the transmission losses on the way thereto are small.

If the wheel electronic system 30 has its own power supply, this can also preferably serve to supply power to the sensor elements 10. The sensor element 10 therefore becomes lighter in weight and generates a relatively small unbalance in the wheel 14. The power can also be transmitted to the wheel electronic system 30 from the elements arranged on the vehicle side (via the antenna 21 to the antenna 20 in the wheel), and can be used there for supplying power to the wheel electronic system 30 and the sensor elements 10. There is therefore advantageously no need for a battery or accumulator in the wheel 14.

Figure 3:
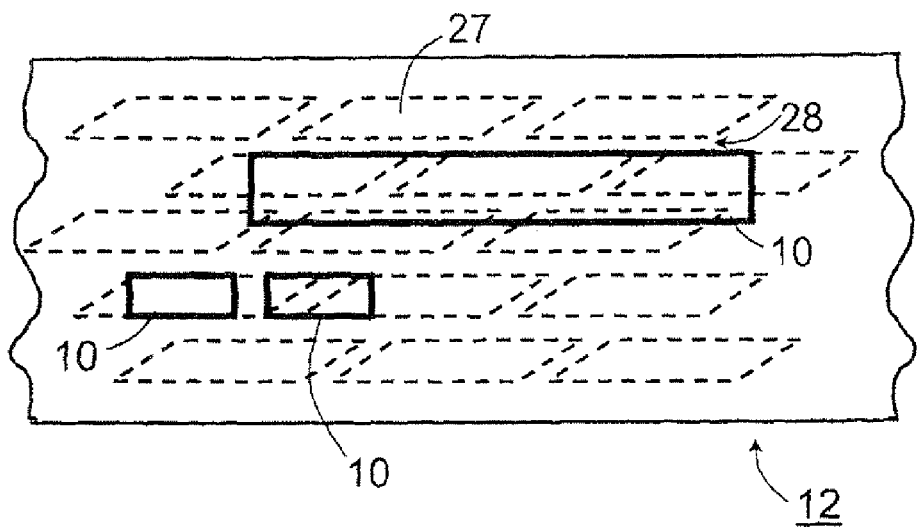
FIG. 3 shows a plan view of the inner side of a motor vehicle tire on which a plurality of sensor elements of a device according to the invention are arranged according to a preferred exemplary embodiment of the present invention.

When the wheel 14 rotates, the tire contact area 13 in FIG. 3 (represented by dashed lines in FIG. 3) migrates further in relation to the sensor element 10 in the rotational direction corresponding to the rotational speed. Viewed in relation to the ground, the kink 15 remains largely positionally fixed in the vicinity of the ground. However, since the wheel 14 rotates, the sensor element 10 which is extended in a planar fashion migrates over the kink 15 at the edge of the tire contact area 13, specifically over the rear and the front kink 15 at each rotation.

In order to obtain the largest possible measured values, the sensor can extend in a strip shape (as illustrated in FIG. 3) along the tread 12 over a plurality of regions opposite the lugs 27 and grooves 28. The kink 15 consequently migrates over the surface of the sensor element 10, specifically for a longer time the longer the extent of the sensor element 10 in the circumferential direction of the tire. The long action time generates a larger and more clearly measureable signal.

However, a large and therefore relatively heavy sensor element 10 has the disadvantage that the weight produces an unbalance in the tire 11, which, under certain circumstances, has to be balanced out again.

It is alternatively or additionally possible to arrange a plurality of sensor elements 10 in a tire 11, as illustrated in the lower half of the diagram in FIG. 3. A sensor element 10 can therefore be arranged in the region opposite at least one part of a lug 27, and another sensor element 10 can be arranged opposite at least one part of a groove 28. Consequently, the deformations of the first and second sensor elements 10 can be compared with one another, which is advantageous for plausibility reasons. The individual values or a mean value can be transmitted to the control and evaluation unit 24 and evaluated there.

However, the deformation in the region of a lug 27 is only small in comparison with the deformation in the region of a groove 28, compared with the overall deformation of the entire tread 12 transversely with respect to the tread 12 in the region of the kink. This is because, even though the tread 12 is deformed to a lesser degree in the region of a lug 27 owing to the relatively large thickness 17 of the material than in the region of a groove 27 (this is dependent on the thickness 17 of the material, the width of the lugs 27 and the width of the groove 28), these deformations transversely with respect to the running direction are for the greater part compensated by the structure of the profiled tread 12 and by the overall thickness and rigidity of the material.

Nevertheless, the location at which the sensor elements 10 are mounted and the extent thereof should be known precisely in order to be able to precisely detect the change in the tread depth 16 over time. In the case of a tire without a lug (treadless tire), the deformations transversely with respect to the running direction would be constant. The deformation along the running direction (kink 15 owing to the tire contact area 13) changes over time owing to the wear of the lugs 27. This can be measured well over a long time by comparing the measured actual values with earlier measured values and/or the time profile of the measured values.

By evaluating the deformation in the edge region of the tire contact area 13 in a prototype of the tire 11, the corresponding values for the deformation can be determined in advance and the associated tread depth 16 can be associated as a reference value.

Consequently, reference values for the tread depth 16 with respect to the deformation of the sensor elements 10 are obtained. The reference values are preferably recorded at a predetermined tire pressure. A measured value table, which associates a tread depth 16 with a measured value, is therefore obtained. The measured value table can be stored as a reference table in the control and evaluation unit 24. The tire pressure and/or the temperature measured at a particular time during the journey of the motor vehicle can be used, for example, to correspondingly correct the measured values for the deformation, and therefore the determined tread depth 16.

It is also additionally or alternatively possible to determine a gradient for the wear of the tread 12. The reduction in the tread depth 16 goes hand in hand with the wear. On the basis of the gradient, the tread depth 16 and the reaching of a limiting value (exceeding or undershooting of a threshold value) can also alternatively or additionally be determined, and the tires 11 should then also be changed so that the tread 12 still has enough tread depth 16. The driving safety is therefore improved further.

In order to improve the measuring accuracy, the sensor elements 10 should preferably be arranged in the circumferential direction of the tread 12, i.e. along a circumferential line of the tread 12. Along such a circumferential line, the loading of the tire 11 in the region of the tire contact area is of equal magnitude in contrast to a lateral mounting. This is because, during cornering, the load on the side on the outside of the bend is larger than on the side on the inside of the bend. Therefore, in the case of cornering which lasts for a relatively long time an incorrect tread depth 16, which is possibly no longer present in the case of straight-ahead travel, would possibly be detected. Furthermore, during cornering the kink 15 may no longer be of equal magnitude transversely with respect to the running direction, for example due to the slightly oblique positioning of the motor vehicle.

It is therefore advantageous to arrange the sensor elements 10 along the running direction in the central region of the tread 12 and to measure the deformation there. This is because the minimum tread depth should preferably also be measured in this region.

Figure 4:
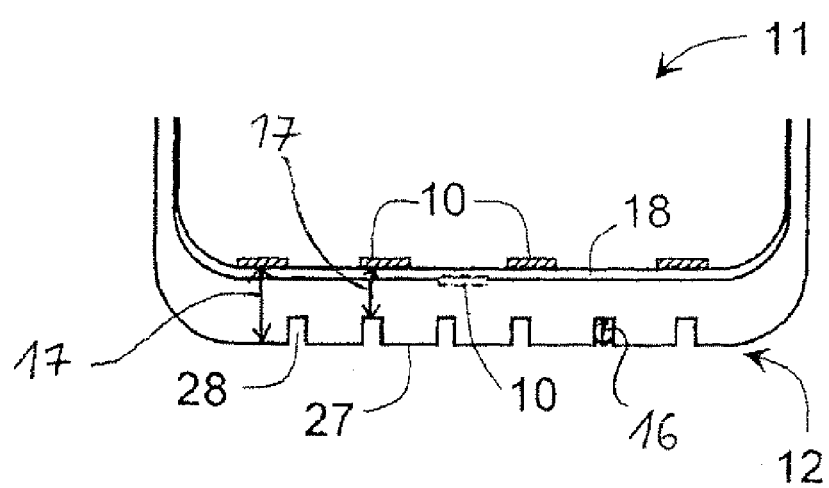
FIG. 4 shows a sectional view through a tire transversely with respect to the running direction with a plurality of sensor elements of a device according to the invention, according to a preferred exemplary embodiment of the present invention.

The respective tread depth 16 across the width of the tire 11 (transversely with respect to the running direction) can be measured, in particular, by sensor elements 10 if one or more sensor elements 10 are arranged essentially transversely with respect to the running direction over the entire width (FIG. 4). If the profile depth 16 changes to an increased degree viewed at a location in the transverse direction compared to the neighboring locations, the motor vehicle user can therefore be made aware of this fact.

FIG. 4 illustrates, in a dashed illustration, a sensor element 10 according to a further preferred exemplary embodiment of the present invention, wherein this sensor element 10 is arranged on the side of the carcass 18 facing the tread 12.

The tread depth 16 is characterized by the difference between the height or external surface of the lug 27 and the depth or base surface of the groove 28, as illustrated in FIG. 4.

The thickness 17 of the material is, in contrast, characterized by the thickness of the material of the tire between, for example, a sensor element 10 which is arranged on the inner side of the motor vehicle tire 11 and the outer lateral surface of the tread 12. The thickness of the material is made larger in the region of a lug 27 than in the region of a groove 28, as is also illustrated in FIG. 4. The thickness 17 of the material in the region of a lug 27 changes through wear of the tire 11 in the region of the lugs 27, while the thickness 17 of the material in the region of the grooves 28 does not change here. Consequently, the tread depth 16 changes in accordance with the wear of the tire 11 in the region of the lugs 27, i.e. only the lugs 27 experience wear owing to contact with the road covering, as a result of which also only the thickness 17 of the material in the region of the lugs 27 changes. The respective height of the lugs is therefore indicative of the change in the tread depth 16.

An excessively high tire pressure can, under certain circumstances, generate a greater degree of wear in the centre of the tread 12. An excessively low tire pressure can, on the other hand, entail, under certain circumstances, wear on the edge regions of the tread 12. Owing to other causes (for example incorrect wheel alignment etc.) uneven wear may occur transversely with respect to the running direction, to which the motor vehicle user's attention can be drawn if the sensor elements 10 are arranged at a plurality of locations transversely with respect to the tread 12.

The sensor elements 10 can also be embodied or arranged longitudinally with respect to the circumferential line and transversely with respect to the rolling direction. Consequently, the entire tread 12 can be advantageously sensed by measuring technology with respect to the wear.

The sensor elements 10 are advantageously arranged in a region in which a transition from a groove 28 to a lug 27, or vice versa, is present opposite the tread 12. Although the deformations in the region of the groove 28 are local owing to the small thickness 17 of material of the tread 12 in this region, the overall rigidity of the profiled tread 12 makes the deformations which are generated thereby appear very small. It is therefore advantageous to consider the time profile of the deformation which has been sensed by same sensor element 10 and therefore at the same location in the tread 12. The tread depth 16 for this location can then be determined therefrom. For the rest of the tread 12 it is then preferably assumed that the tread experiences wear uniformly over its circumference.

In order to obtain more precise values of the tread depth 16, it is advantageous to arrange one or more sensor elements 10 in the region of a groove 28 and one or more sensor elements 10 in the region of a lug 27 and to compare the acquired measured values with one another. In addition, a series of measured values, which have been picked up in chronological succession, can also be placed in relationship with one another in order to determine the tread depth 16.

Furthermore, in order to evaluate the tread depth 16, measured values which have been measured previously (or during previous journeys) and, if appropriate, also afterwards, can be placed in relationship with one another. As a result it is therefore also possible to carry out a plausibility check as to whether the values measured at a certain time constitute measuring errors or correct measured values.

The measured values are additionally dependent on the current tire pressure. Current absolute values for the tread depth 16 can then be reliably specified if the previous measured values, stored reference values for the initial thickness 17 of the material, material values of the tire 11 and the influence thereof on the kink 15, the currently prevailing temperature in the tire and/or the current tire pressure during the determination of the tread depth 16 are taken into account.

The sensor elements 10 can be embodied, for example, as piezoelements in which an electrical voltage is generated when mechanical deformation occurs. The magnitude of the voltage is measured and the measured value is ultimately transmitted to the control and evaluation unit 24, from which the tread depth 16 is then calculated.

If piezoelements are used, it is additionally possible to generate the power for the transmission of the measured values on the basis of the deformation of the sensor element 10 without an additional power source being required. This is because when the piezoelement is deformed, it generates a voltage which, given a suitable configuration of the piezoelement, can be used for the power supply.

The sensor elements 10 can also contain strain gauges whose resistance value changes when deformation (extension, bending or compression) occurs. By measuring the resistance by means of a measurement of the current or the voltage, it is possible to determine a measured value for the current tread depth 16, since the deformation of the tread 12 goes hand in hand with a change in the tread depth 16.

Other technologies for the sensor elements 10 for sensing the deformation are also possible. In all types of sensor elements 10 it is important that the sensor element 10 can measure the deformation of the tread 12 as it deviates from the round shape of the tire 11. The sensor element 10 should therefore, on the one hand, be easily deformable and, on the other hand, be connected to the tire material in a permanent and planar fashion. The sensor element 10 then also satisfactorily undergoes the deformation owing to the tire contact area 13 and continuously or intermittently supplies data to the control and evaluation unit 24.

The best transmission of the deformation to the sensor element 10 occurs if the sensor element 10 is permanently connected in a planar fashion to the tread material or to the carcass 18. Otherwise, the sensor element 10 should be bonded or vulcanized in a planar fashion to the tire material on the inner side of the tread 12.

The lighter in weight the sensor element 10, the lower the unbalance as a result of the sensor element 10. Since there are tires 11 with longitudinal, transverse or oblique grooves, the kink 15 may not always be formed precisely transversely with respect to the running direction but rather deviates slightly therefrom on a local basis. In order to measure every deformation, the sensor element 10 can preferably pick up deformations in every direction and measure them by means of measuring technology. This means that the sensor element 10 should also undergo the deformation in every direction and react in a sensitive fashion to the deformation.

During the evaluation of the measured values, the measurement signals from the various tires 11 on the motor vehicle are preferably evaluated separately from one another. For this purpose it is advantageous if encoding or an identifier for the wheel position is also contained in the measurement signal. However, a mechanical, local assignment of the wheel 14 to the motor-vehicle-side receiver unit 22 can also be present, in which case the measurement signals are then fed to the control and evaluation unit 24 on separate paths as a separate signal or at separate times.

The measured values are, for example, continuously picked up during the travel (rolling wheel 14). In order to reduce the energy consumption for operating the sensor elements 10 and for the transmission of the measured data, measured values can also be picked up at every n-th rotation of the wheel and passed on. It is advantageous if individual atypical values among the measured values are automatically ignored. For this purpose, for example, the current measured values are compared with the measured values previously and, if appropriate, also afterwards. If it is detected that a jump (measured value differs by more than a predefined amount from the previous measured value or values) is suddenly present in the measured value profile in the tread depth 16, the subsequent measured values are considered more precisely. If the measured values return to the level which occurred before and was picked up over a relatively long time, then there has been a measuring error which should not activate an indication or display for the motor vehicle user. If a jump remains in the tread depth 16 a piece of the tread, such as for example a lug 27, in the region opposite the sensor element 10 could have been mechanically damaged or torn out. If appropriate, a display or indication for the motor vehicle user can then be activated who subsequently inspects the tire 11 himself or can bring this about.

Since wear generally only occurs slowly, a large number of measured values can be averaged over time. Short-term atypical values then automatically have a less pronounced effect. A reliable statement about the tread depth 16 and the reaching of a limiting value for the tread depth 16 can then be made by means of a long-term evaluation of the measured values, which can be stored in the control and evaluation unit 24.

Other mathematical methods/algorithms, such as for example approximation of the measured values by means of a curve, can also be applied to the measured values, and the tread depth 16 or the time/number of kilometers which can still be traveled before the tires 11 have to be changed, can be calculated therefrom.

A warning for the motor vehicle user is preferably issued considerably before the legally prescribed minimum tread depth is reached, so that, on the one hand, there is sufficient reliability in the event of measuring inaccuracies and, on the other hand, the motor vehicle user has enough time or can still travel for a sufficiently long time until the tires 11 are changed. The motor vehicle user can also be informed of the distance which can still be traveled with the same tires 11, for which distance it is still possible to drive without danger due to the tire profile.

Although the present invention has been described above on the basis of preferred exemplary embodiments, it is not restricted thereto but rather can be modified in a variety of ways. The abovementioned exemplary embodiments can also be combined with one another in a desired fashion.

The device for measuring the tread depth 16 of a motor vehicle tire can be used not only in tires of passenger vehicles but also in motorcycles, trucks or other utility vehicles.

The invention claimed is:

1. A device for measuring a tread depth of a motor vehicle tire, the device comprising:
    at least one sensor element configured for acquiring data relating to a change in a deformation characteristic of the motor vehicle tire in a region of a tire contact area when said sensor element is permanently mounted to an inner side of the motor vehicle tire opposite the tread; and
    a control and evaluation unit having a data connection configured for receiving the data acquired by said at least one sensor element and for further processing the acquired data, said control and evaluation unit configured to determine the tread depth of the motor vehicle tire based on a degree of bending of a tread of the motor vehicle tire, wherein the degree of bending of the tread of the motor vehicle tire is indicated by the data acquired by said at least one sensor element; and
    a wheel electronic system electrically connected to said at least one sensor element and configured for transmitting tire identification data to said control and evaluation unit.

2. The device according to claim 1, wherein said at least one sensor element is a planar piezoelement generating an electrical voltage when a planar mechanical deformation occurs.

3. The device according to claim 1, wherein said at least one sensor element is a planar strain gauge a resistance value of which changes with a planar deformation.

4. The device according to claim 1, wherein said at least one sensor element extends substantially along a running direction of the motor vehicle tire.

5. The device according to claim 1, wherein said at least one sensor element extends over at least one section region of a lug and/or over at least one section region of a groove of the motor vehicle tire.

6. The device according to claim 1, which comprises a transmission unit assigned to said at least one sensor element or to a group of sensor elements, said transmission unit passing the data measured by said at least one sensor element to said control and evaluation unit.

7. The device according to claim 6, wherein said control and evaluation unit is mounted on the motor vehicle.

8. The device according to claim 6, wherein transmission unit passes the data acquired by said at least one sensor element indirectly or directly to said control and evaluation unit.

9. The device according to claim 1, wherein additional data can be transmitted by said wheel electronic system to said control and evaluation unit.

10. The device according to claim 9, wherein the additional data is selected from the group consisting of tire pressure data, tire temperature data, vehicle speed data, wheel speed data, sensor element data, vehicle data, and wheel load data.

11. The device according to claim 1, wherein said at least one sensor element is one of a plurality of sensor elements disposed in the motor vehicle tire and arranged on a circumferential line along a circumference of the tread of the motor vehicle tire.

12. The device according to claim 1, wherein said at least one sensor element is one of a plurality of sensor elements disposed in the motor vehicle tire and arranged transversely with respect to the running direction of the motor vehicle tire.

13. A method of measuring a tread depth of a motor vehicle tire which comprises the following method steps:
   providing at least one sensor element configured to acquire data relating to a change in a deformation characteristic of a motor vehicle tire in a tire contact region of the vehicle tire;
   mounting the at least one sensor element in a stable fashion on an inner side of the motor vehicle tire opposite the tread;
   acquiring data relating to a change in the deformation characteristic of the motor vehicle tire in the region of the tire contact region by way of the at least one sensor element;
   transmitting the data acquired by the at least one sensor element to a control and evaluation unit provided with a data connection to the at least one sensor element;
   transmitting, in addition to the data acquired by the at least one sensor element, a tire-specific identifier for associating the data with a given motor vehicle tire; and
   processing the data acquired by the at least one sensor element with the control and evaluation unit to determine the tread depth of the given motor vehicle tire based on a degree of bending of the tread of the given motor vehicle tire.

14. The method according to claim 13, which comprises detecting with the at least one sensor element at least one of the following: changes in a surface curvature in a region of the tire contact region entry or tire contact region exit, a change in running time of a run-through time of the tire contact region, a curvature gradient of the at least one sensor element, and/or a variation in vibrations of the motor vehicle tire.

15. The method according to claim 13, which comprises continuously detecting changes in a deformation characteristic of the motor vehicle tire in a region of the tire contact region in each motor vehicle tire of a motor vehicle during a rotation of the motor vehicle tires, and determining the tread depth separately for each motor vehicle tire by way of the control and evaluation unit.

16. The method according to claim 13, which comprises comparing the data acquired by the at least one sensor element with one another and evaluating the data together by means of the control and evaluation unit.

17. The method according to claim 16, which comprises comparing the data for a plausibility check.

18. The method according to claim 13, which comprises actuating a display or indicator unit by the control and evaluation unit to issue a display or indication to a motor vehicle user, if the acquired data and evaluated data reveal that a predetermined limiting value for the tread depth of the respective motor vehicle tire has been reached.

19. The method according to claim 18, wherein the display or indicator unit is an optical, acoustic or haptic display or indicator unit.

20. The device according to claim 1, wherein said control and evaluation unit is configured for determining the tread depth of the motor vehicle tire based on the data acquired by said at least one sensor element and on a pressure measured in the motor vehicle tire.

21. The method according to claim 13, which comprises: when performing the step of processing the data acquired by the at least one sensor element, the control and evaluation unit determines the tread depth of the given motor vehicle tire based on the data acquired by the at least one sensor element and on a pressure measured in the given motor vehicle tire.

* * * * *